(12) United States Patent
Mizutani et al.

(10) Patent No.: US 10,666,457 B2
(45) Date of Patent: May 26, 2020

(54) RELAY DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventors: Tomohiro Mizutani, Mie (JP); Tsubasa Kanamori, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 16/060,472

(22) PCT Filed: Jan. 30, 2017

(86) PCT No.: PCT/JP2017/003145
§ 371 (c)(1),
(2) Date: Jun. 8, 2018

(87) PCT Pub. No.: WO2017/141676
PCT Pub. Date: Aug. 24, 2017

(65) Prior Publication Data
US 2018/0367335 A1    Dec. 20, 2018

(30) Foreign Application Priority Data
Feb. 18, 2016   (JP) ................................ 2016-029262

(51) Int. Cl.
*H04L 12/46* (2006.01)
*B60R 16/023* (2006.01)
(Continued)

(52) U.S. Cl.
CPC ............ *H04L 12/46* (2013.01); *B60R 16/023* (2013.01); *H04L 12/40013* (2013.01);
(Continued)

(58) Field of Classification Search
CPC ... H04L 12/46; H04L 49/35; H04L 12/40013; H04L 12/56; H04L 29/02;
(Continued)

(56) References Cited

U.S. PATENT DOCUMENTS 9,541,937 B2 * 1/2017 Horihata ................. H04L 12/12
2004/0076430 A1 * 4/2004 Zaacks ............. H04B 10/07953
398/27

(Continued)

FOREIGN PATENT DOCUMENTS

JP     2000-138687 A    5/2000
JP     2009-284085 A    12/2009

OTHER PUBLICATIONS

Search Report for PCT/JP207/003145, dated Apr. 18, 2017.

*Primary Examiner* — Mehmood B. Khan
(74) *Attorney, Agent, or Firm* — Honigman LLP (57) ABSTRACT

A relay device transmits a frame received from any of a plurality of external devices that are connected via a plurality of communication lines. The external device is connected to one of the communication lines and to another one of the communication lines by searching a relay information table for specifying a relay destination of the frame. In the relay information table, information for identifying a frame type is stored in association with relay destination identifying information for identifying a communication line serving as a relay destination of a frame. The relay information table is partitioned into a plurality of sub-tables in accordance with priority based on the type identifying information or the relay destination identifying information. The
(Continued)

relay device searches the sub-tables in descending order of priority using the type identifying information contained in the frame received from the external device as a search key specifying the relay destination.

3 Claims, 7 Drawing Sheets (51) Int. Cl.
*H04L 12/40* (2006.01)
*H04L 12/54* (2013.01)
*H04L 29/02* (2006.01)
*H04L 12/931* (2013.01)

(52) U.S. Cl.
CPC .......... *H04L 12/4625* (2013.01); *H04L 12/56* (2013.01); *H04L 29/02* (2013.01); *H04L 49/35* (2013.01); *H04L 2012/40215* (2013.01); *H04L 2012/40234* (2013.01); *H04L 2012/40241* (2013.01); *H04L 2012/40273* (2013.01)

(58) Field of Classification Search
CPC . H04L 2012/40215; H04L 2012/40241; H04L 2012/40234; H04L 2012/40273; B60R 16/023

See application file for complete search history.

(56) References Cited

U.S. PATENT DOCUMENTS

| | | | |
|---|---|---|---|
| 2005/0220129 A1* | 10/2005 | Boyd | H04L 12/4641 370/428 |
| 2009/0234841 A1* | 9/2009 | Watanabe | G06F 16/9017 |
| 2014/0154971 A1* | 6/2014 | Tanaka | H04L 12/4625 455/7 |
| 2014/0297109 A1* | 10/2014 | Shimomura | H04L 67/125 701/36 |
| 2014/0297110 A1* | 10/2014 | Noda | H04L 12/40006 701/36 |

* cited by examiner

| MESSAGE ID | TRANSMISSION SOURCE BUS ID | RELAY DESTINATION BUS ID |
|---|---|---|
| 100 | 1 | 2 |
| 110 | 1 | 2,3 |
| 200 | 2 | 1 |
| 300 | 2 | 1,3 |
| 400 | 3 | 1 |
| 500 | 3 | 1 |
| 510 | 3 | 1,2 |
| 130 | 1 | 3 |
| ⋮ | ⋮ | ⋮ |
| 210 | 2 | 1,3 |
| ⋮ | ⋮ | ⋮ |
| 530 | 3 | 2 |
| 101 | 1 | 2 |
| 102 | 1 | 2,3 |
| ⋮ | ⋮ | ⋮ |
| 201 | 2 | 3 |
| 203 | 2 | 1 |
| ⋮ | ⋮ | ⋮ |

FIG. 6

| MESSAGE ID | TRANSMISSION SOURCE BUS ID | RELAY DESTINATION BUS ID |
|---|---|---|
| 200 | 2 | 1 |
| ⋮ | ⋮ | ⋮ |
| 203 | 2 | 1 |
| ⋮ | ⋮ | ⋮ |
| 210 | 2 | 1,3 |
| ⋮ | ⋮ | ⋮ |
| 300 | 2 | 1,3 |
| ⋮ | ⋮ | ⋮ |
| 400 | 3 | 1 |
| ⋮ | ⋮ | ⋮ |
| 500 | 3 | 1 |
| 510 | 3 | 1,2 |
| ⋮ | ⋮ | ⋮ |
| 100 | 1 | 2 |
| 102 | 1 | 2,3 |
| 102 | 1 | 2 |
| ⋮ | ⋮ | ⋮ |
| 110 | 1 | 2,3 |
| ⋮ | ⋮ | ⋮ |
| 530 | 3 | 2 |
| ⋮ | ⋮ | ⋮ |
| 130 | 1 | 3 |
| ⋮ | ⋮ | ⋮ |
| 201 | 2 | 3 |
| ⋮ | ⋮ | ⋮ |

— 1 —
RELAY DEVICE

CROSS-REFERENCE TO RELATED APPLICATIONS

This application is the U.S. national stage of PCT/JP2017/003145 filed Jan. 30, 2017, which claims priority of Japanese Patent Application No. 2016-29262 filed on Feb. 18, 2016, which is incorporated herein by reference in its entirety.

FIELD OF THE INVENTION

The present description relates to a relay device.

BACKGROUND OF THE INVENTION

Many systems have recently been used that execute a wide variety of kinds of processing by assigning respective functions to a plurality of communication devices connected via communication lines and causing the plurality of communication devices to cooperate with one another. For example, in the field of in-vehicle LANs (Local Area Networks) that are installed in vehicles, such a system realizes a wide variety of functions by employing ECUs (Electronic Control Units) as communication devices and causing the ECUs to perform specific kinds of processing to which the ECUs are respectively tailored and exchange messages with one another.

For example, in an in-vehicle communication system based on the CAN (Controller Area Network) communication protocol (hereinafter also simply referred to as "protocol"), the number of ECUs that can be connected to a single communication line is limited, and the communication speed varies depending on the role of each ECU. Therefore, a configuration is often adopted in which ECUs are divided into a plurality of groups and a plurality of ECUs in each group are connected to a single communication line in advance, and messages sent among the plurality of communication lines are relayed by a relay device (gateway).

The relay device realizes the relay processing by identifying frames received from the ECUs based on message IDs, for example; referencing, using the message IDs used for identification as a search key, a relay information table for judging whether or not the frames need to be relayed and specifying communication lines serving as relay destinations; and transmitting frames that should be relayed, from communication lines that have been specified as relay destinations. If the number of ECUs to be relayed increases, or the traffic temporarily increases, the performance of relay processing of the relay device may significantly decrease.

Thus, various methods for preventing a decrease in the communication quality or increasing the speed of relay processing, by providing the relay device with a QoS (Quality of Service) function, have been proposed. For example, JP 2009-225441A discloses a gateway device that efficiently searches for a memory area that stores data to be transmitted, from an ID-based buffer that is partitioned into memory areas for respective IDs each indicating a transmission source of frame data. This device is provided with index flags indicating the update status of respective groups, each of which includes a plurality of update flags indicating whether or not data in the memory area is updated. The device is configured to first search the index flags and then search the update flags to search for a memory area that stores data to be transmitted.

JP 2000-244570A discloses a relay device that stores a packet received from a communication line via a network interface unit in a packet buffer and stores header information of the packet in a quickly-accessible header RAM to deter contention between a reading process and a writing process with respect to the header RAM, thereby achieving high-speed routing while guaranteeing a certain level of communication quality (QoS).

Moreover, JP 2001-211203A discloses a network relay device that improves the performance of relay processing by adopting a configuration in which a routing processor that searches for transfer destinations of packets from header information of the packets and transfers the packets is provided with a plurality of packet transfer units that execute the transfer of packets, and received packets are assigned to the packet transfer units on a packet-by-packet basis. Furthermore, JP 2006-352235A discloses a gateway that can increase the processing speed and ensure a certain level of communication quality by adopting a configuration in which the gateway includes, for each of a plurality of networks, a protocol controller that performs control processing of a communication protocol, a search engine that acquires information corresponding to an ID of a frame processed by the protocol controller from a destination search table, and a frame converter, and performs autonomous relay processing by hardware.

SUMMARY OF THE INVENTION

A relay device according to an aspect of the description is a relay device for transmitting a frame transmitted from any of a plurality of external devices that are communicably connected via a plurality of communication lines, the external device being connected to one of the communication lines, to another one of the communication lines, thereby relaying the frame, the relay device including a relay information table in which type identifying information for identifying a frame type is stored in association with relay destination identifying information for identifying a communication line serving as a relay destination of a frame, and a control unit configured to search the relay information table based on the type identifying information contained in the frame transmitted from the external device, thereby specifying the relay destination of the frame, wherein the relay information table is partitioned into a plurality of sub-tables in accordance with priority based on the type identifying information or the relay destination identifying information, and the control unit is configured to search the sub-tables in descending order of priority.

DETAILED DESCRIPTION OF THE PREFERRED EMBODIMENTS

Description of Embodiments

The technologies disclosed above in the background mainly aim to establish a device or a system, and therefore guarantee the minimum performance without giving consideration to the maximum performance, or assume processing using abundant resources, such as dedicated hardware and multi-core processing. On the other hand, there is a demand that certain communications be quickly processed without consuming excessive resources, and at the same time, with respect to communications other than the certain communications, as high QoS as possible be maintained.

The present description was made in view of the above-described circumstances, and it is an object thereof to provide a relay device that can minimize a decrease in QoS while guaranteeing the maximum performance for certain communications with limited resources.

According to the disclosure of this application, it is possible to minimize a decrease in QoS while guaranteeing the maximum performance for certain communications with limited resources.

First, aspects of the present description will be listed and described. Note that embodiments described below may be at least partially combined as desired.

(1) A relay device according to an aspect of the description is a relay device for transmitting a frame transmitted from any of a plurality of external devices that are communicably connected via a plurality of communication lines, the external device being connected to one of the communication lines, to another one of the communication lines, thereby relaying the frame, the relay device including a relay information table in which type identifying information for identifying a frame type is stored in association with relay destination identifying information for identifying a communication line serving as a relay destination of a frame, and a control unit configured to search the relay information table based on the type identifying information contained in the frame transmitted from the external device, thereby specifying the relay destination of the frame, wherein the relay information table is partitioned into a plurality of sub-tables in accordance with priority based on the type identifying information or the relay destination identifying information, and the control unit is configured to search the sub-tables in descending order of priority.

According to this aspect, records in which the type identifying information for identifying frame types is associated with the relay destination identifying information for identifying communication lines serving as the relay destinations of respective frames are stored in the relay information table, and furthermore, the relay information table is partitioned into a plurality of sub-tables in accordance with priority based on the type identifying information or the relay destination identifying information contained in the records. The relay device receives a frame transmitted from an external device connected to any one of the plurality of communication lines, searches the sub-tables in descending order of priority using the type identifying information contained in the received frame as the search key, and transmits the received frame to a communication line that is identified by the relay destination identifying information contained in a matching record obtained in the search to relay the received frame. Thus, the higher the priority of a frame based on the type identifying information or the relay destination identifying information thereof, the smaller the processing amount that is needed to obtain a search hit, and accordingly, the communication line serving as the relay destination of that frame is specified within a short period of time.

(2) It is preferable that the sub-tables are sorted in a predetermined order based on the type identifying information.

According to this aspect, since the sub-tables are sorted in a predetermined order based on the type identifying information contained in the records, the sub-tables are quickly searched using a binary tree searching method, for example.

(3) It is preferable that the frame is a frame conforming to a CAN, LIN (Local Interconnect Network), MOST (Media Oriented Systems Transport), TCP/IP (Transmission Control Protocol/Internet Protocol), AVTP (Audio Video Transport Protocol), or FlexRay (registered trademark) communication protocol.

According to this aspect, since frames conforming to the CAN, LIN, MOST, TCP/IP, AVTP, or FlexRay communication protocol are relayed, a relay device suitable for an in-vehicle communication system is realized.

A specific example of a relay device according to an embodiment of the present description will be described below with reference to the drawings.

Figure 1:
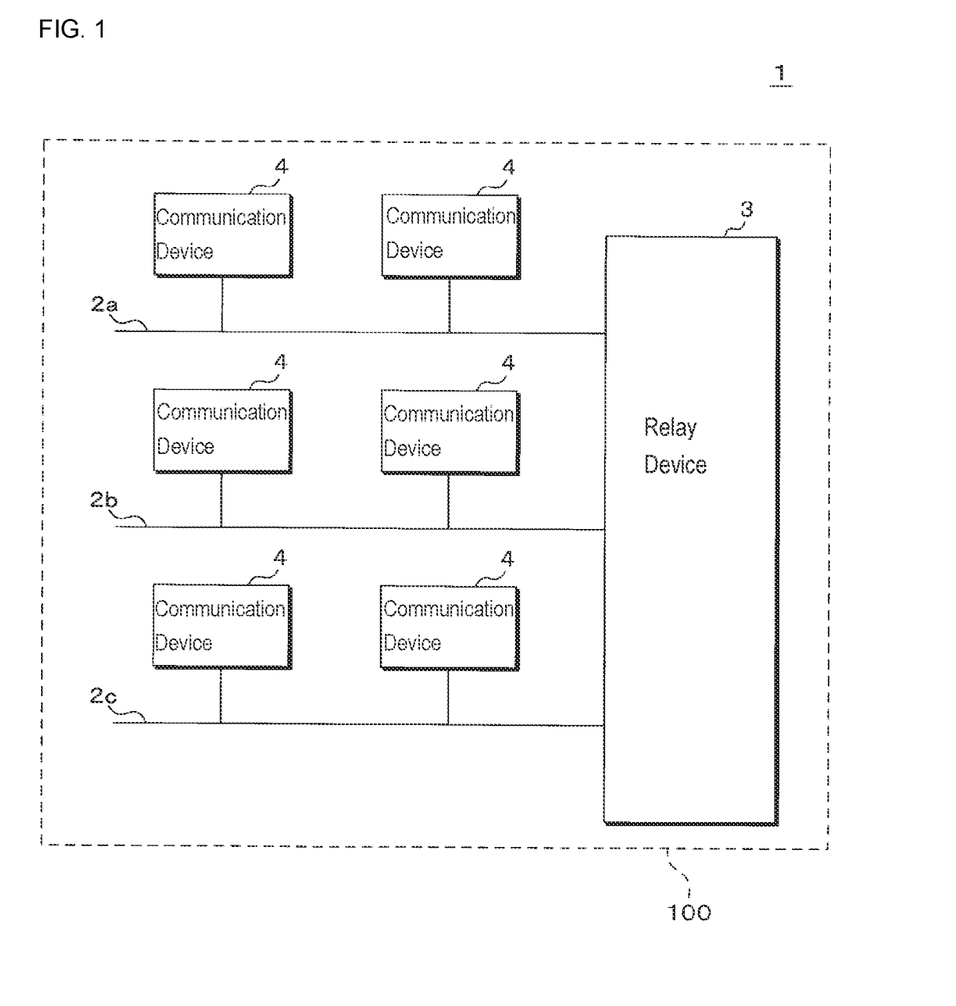
FIG. 1 is a block diagram showing a configuration of an in-vehicle communication system according to an embodiment of the present description.

Hereinafter, the present description will be specifically described based on the drawings showing an embodiment thereof. Note that, in the embodiment below, a case in which the present description is applied to an in-vehicle communication system will be described as an example. FIG. 1 is a block diagram showing a configuration of an in-vehicle communication system 1 according to an embodiment of the present description. The in-vehicle communication system 1 includes communication devices (corresponding to external devices) 4, which are ECUs, each communication device 4 being connected to a corresponding one of a plurality of communication buses (corresponding to communication lines) 2a, 2b, and 2c for which a wire harness or the like is used, and transmitting and receiving frames, as well as a relay device 3 that is connected to the communication buses 2a, 2b, and 2c and that relays frames by receiving a frame transmitted from a communication device 4 connected to one communication bus and transmitting the frame to another communication bus. Frames as used herein are not limited to packets flowing through the data link layer, and may be packets in a broad sense, or so-called messages. The in-vehicle communication system 1 is installed in a vehicle 100, but may also be applied to objects other than the vehicle 100.

The communication devices 4 are each connected to any one of the communication buses 2a, 2b, and 2c in a bus topology, and transmit and receive message frames (hereinafter simply referred to as "frames") that conform to the CAN protocol. Each frame transmitted and received between the communication devices 4 and the relay device 3 contains a message ID (Identifier) for identifying the frame in a header section, and a plurality of data items in a data section. Each of the communication devices 4 transmits frames that contain data obtained through the operation of that communication device 4.

The communication devices 4 are devices capable of transmitting data including numerical information of various physical quantities, such as measured values, calculated values, control values, and the like, and/or controlling in-vehicle equipment, such as an engine, a brake, and the like. For example, a certain communication device 4 functions as an ABS (Antilock Brake System), and a sensor that detects the rotational speed (wheel speed) of a wheel is connected to this communication device 4. The communication device 4 controls the brake based on the wheel speed that is detected via the sensor during braking of the vehicle 100 and transmits measured values of the wheel speed as data to the other communication devices 4 that are connected to the communication buses 2a, 2b, and 2c.

Figure 2:
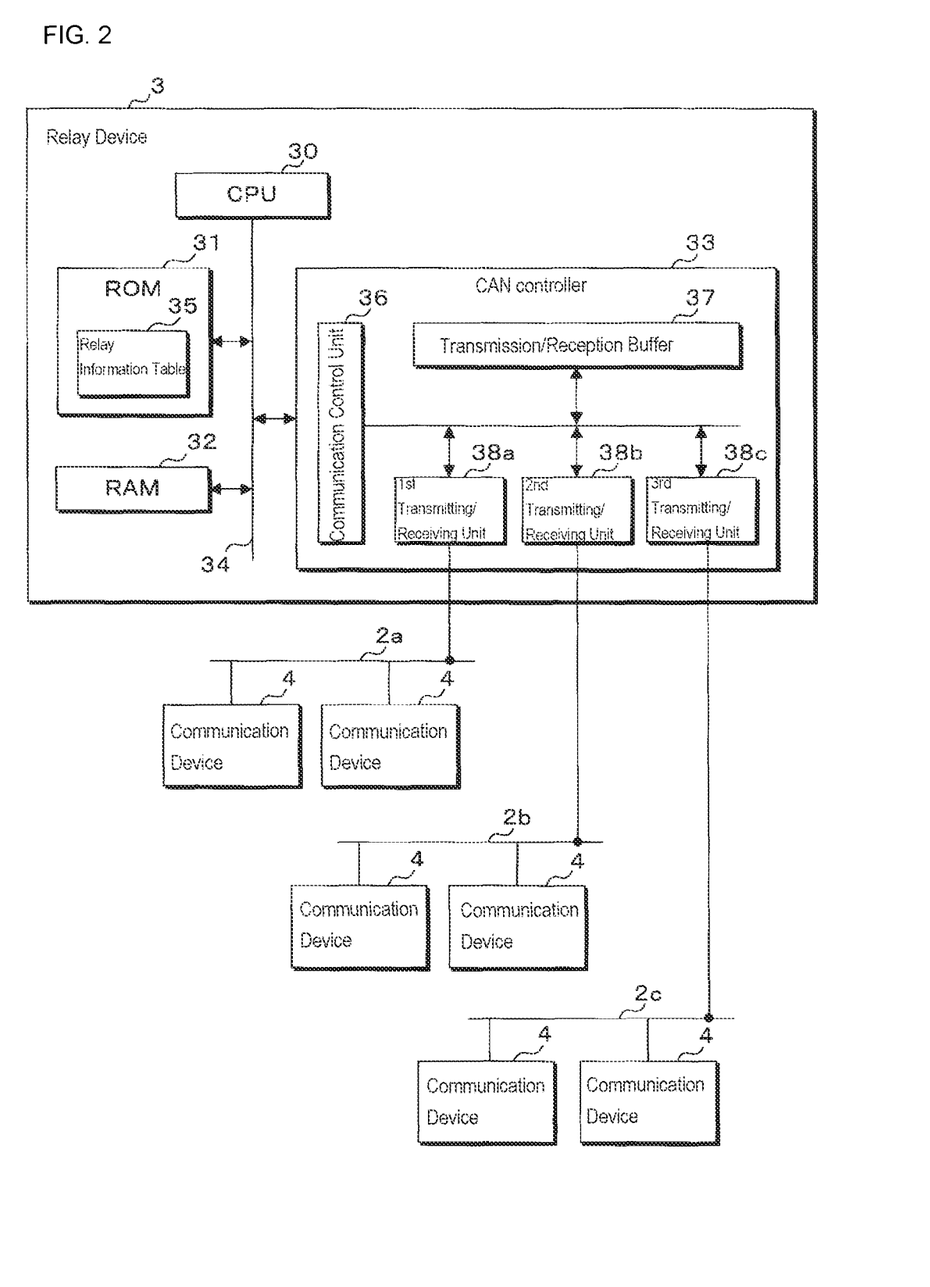
FIG. 2 is a block diagram showing a configuration of a relay device.

FIG. 2 is a block diagram showing a configuration of the relay device 3. The relay device 3 includes a CPU (Central Processing Unit) 30 that controls the operation of various constituent units, a ROM 31 using a non-volatile memory such as a flash memory, an EPROM (Erasable Programmable Read Only Memory), or an EEPROM (Electrically EPROM: registered trademark), a RAM 32 using a rewritable memory such as a DRAM (Dynamic Random Access Memory) or an SRAM (Static Random Access Memory), a CAN controller 33 using a network controller that conforms to the CAN protocol, and an internal bus 34. All of the CPU 30, the ROM 31, the RAM 32, and the CAN controller 33 are connected to one another via the internal bus 34. The CPU 30, the ROM 31, the RAM 32, the CAN controller 33, and the internal bus 34 may constitute a microcomputer. The CPU 30 receives power from a power supply device, which is not shown, such as an alternator or a battery, loads various kinds of information from the ROM 31 into the RAM 32, and controls the CAN controller 33 to cause the CAN controller 33 to transmit and receive frames.

The ROM 31 stores a control program to be loaded and executed by the CPU 30. The ROM 31 also stores a relay information table 35 to be referenced by the CPU 30. The relay information table 35 stores records to be used by the relay device 3 in order to specify communication buses serving as relay destinations when relaying frames. Details of the relay information table 35 will be described later. The RAM 32 temporarily stores information that is generated in the course of processing of the CPU 30.

The CAN controller 33 includes a communication control unit 36, a transmission/reception buffer 37, a first transmitting/receiving unit 38a, a second transmitting/receiving unit 38b, and a third transmitting/receiving unit 38c, and realizes communication via the communication buses 2a, 2b, and 2c in conformity with the CAN protocol.

When frames are received by the first transmitting/receiving unit 38a, the second transmitting/receiving unit 38b, or the third transmitting/receiving unit 38c, the communication control unit 36 stores the received frames in the transmission/reception buffer 37 in the received order and notifies the CPU 30 that the frames have been received. The communication control unit 36 relays the frames based on an instruction from the CPU 30. That is to say, the communication control unit 36 extracts a frame stored in the transmission/reception buffer 37 based on an instruction from the CPU 30 and passes the extracted frame to at least one of the first transmitting/receiving unit 38a, the second transmitting/receiving unit 38b, and the third transmitting/receiving unit 38c that are connected to the respective communication buses 2a, 2b, and 2c, which serve as the relay destinations, to cause the at least one transmitting/receiving unit to transmit the frame. The transmission/reception buffer 37 temporarily stores received frames or frames to be transmitted, using a rewritable memory such as an SRAM or a DRAM.

Each of the first transmitting/receiving unit 38a, the second transmitting/receiving unit 38b, and the third transmitting/receiving unit 38c includes a filter circuit, an AD conversion circuit, or the like, and realizes transmission and reception of frames by detecting a differential voltage in the communication buses 2a, 2b, and 2c and outputting a signal. That is to say, the communication control unit 36 monitors the communication state of the communication buses 2a, 2b, and 2c using the first transmitting/receiving unit 38a, the second transmitting/receiving unit 38b, and the third transmitting/receiving unit 38c, respectively, judges whether or not it is possible for the communication control unit 36 to transmit a frame, and transmits the frame if it is possible. For example, the communication control unit 36 can transmit a frame using the first transmitting/receiving unit 38a while the communication devices 4 connected to the communication bus 2a are not transmitting any frame. On the other hand, while the communication devices 4 connected to the communication bus 2a are transmitting a frame, the communication control unit 36 receives the transmitted frame using the first transmitting/receiving unit 38a.

If a plurality of devices, of the communication devices 4 that are connected to the communication bus 2a and the relay device 3, start transmitting data at the same time, one of the plurality of devices preferentially transmits a frame through arbitration based on the CAN protocol. More specifically, priority/non-priority of a frame is determined in the following manner. A frame is transmitted and received as a digital signal represented by two possible values, 0 (zero) and 1. The message ID contained in the header section at the start of a frame is used as an arbitration field, and arbitration in the communication bus 2a is performed using a bit string in the arbitration field. According to the CAN protocol, a frame having an arbitration field with the longer sequence of 0s (zeros) is preferentially transmitted.

That it to say, when message IDs are interpreted as numerical values, among the communication devices 4 and the relay device 3, any device that transmits a frame having the message ID with the smaller numerical value wins the arbitration. If the communication control unit 36 wins the arbitration in the communication bus 2a, it can continue the transmission using the first transmitting/receiving unit 38a. If the communication control unit 36 loses the arbitration, it stops the transmission using the first transmitting/receiving unit 38a and switches to receiving frames from another communication device 4 that continues transmission.

Figure 3:
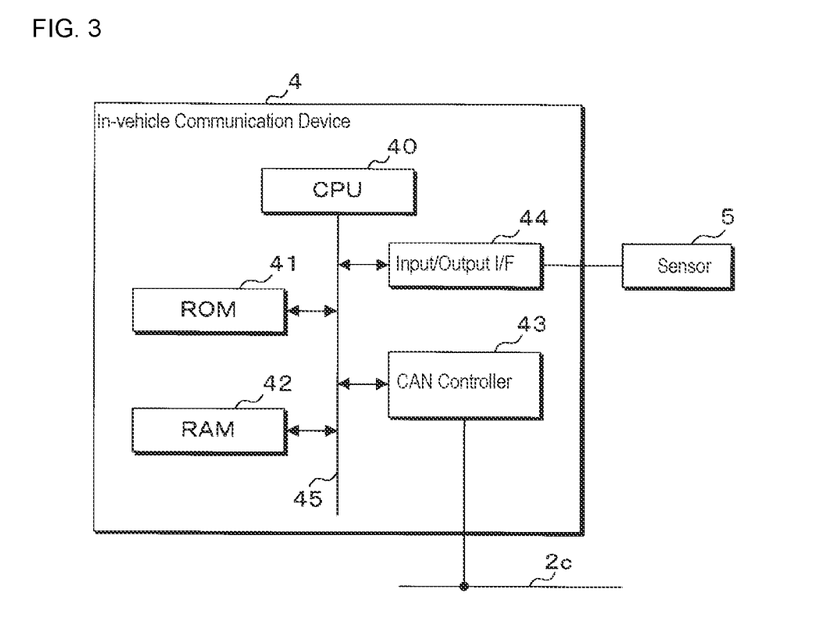
FIG. 3 is a block diagram showing a configuration of a communication device.

FIG. 3 is a block diagram showing a configuration of a communication device 4. The communication device 4 includes a CPU 40 that controls the operation of various constituent units, a ROM 41 using a non-volatile memory such as a flash memory, an EPROM, or an EEPROM, a RAM 42 using a rewritable memory such as a DRAM or an SRAM, a CAN controller 43 using a network controller that conforms to the CAN protocol, an input/output interface (hereinafter referred to as "input/output I/F") 44 connected to an external sensor 5, for example, and an internal bus 45. All of the CPU 40, the ROM 41, the RAM 42, the CAN controller 43, and the input/output I/F 44 are connected to one another via the internal bus 45. The CPU 40, the ROM 41, the RAM 42, the CAN controller 43, the input/output I/F 44, and the internal bus 45 may constitute a microcomputer. The CPU 40 receives power from a power supply device, which is not shown, such as an alternator or a battery, loads various kinds of information from the ROM 41 into the RAM 42, and controls the CAN controller 43 to cause the CAN controller 43 to transmit and receive frames.

The ROM 41 stores a control program to be loaded and executed by the CPU 40. The RAM 42 temporarily stores information that is generated in the course of processing of the CPU 40 or measured values and the like represented by signals that are input from the sensor 5. The CAN controller 43 realizes communication via the communication bus 2a, 2b, or 2c in conformity with the CAN protocol. The CPU 40 executes control based on information of various physical quantities that are acquired from the sensor 5 via the input/output I/F 44 and transmits the frame containing the information to the communication bus 2a, 2b, or 2c.

Figure 4:
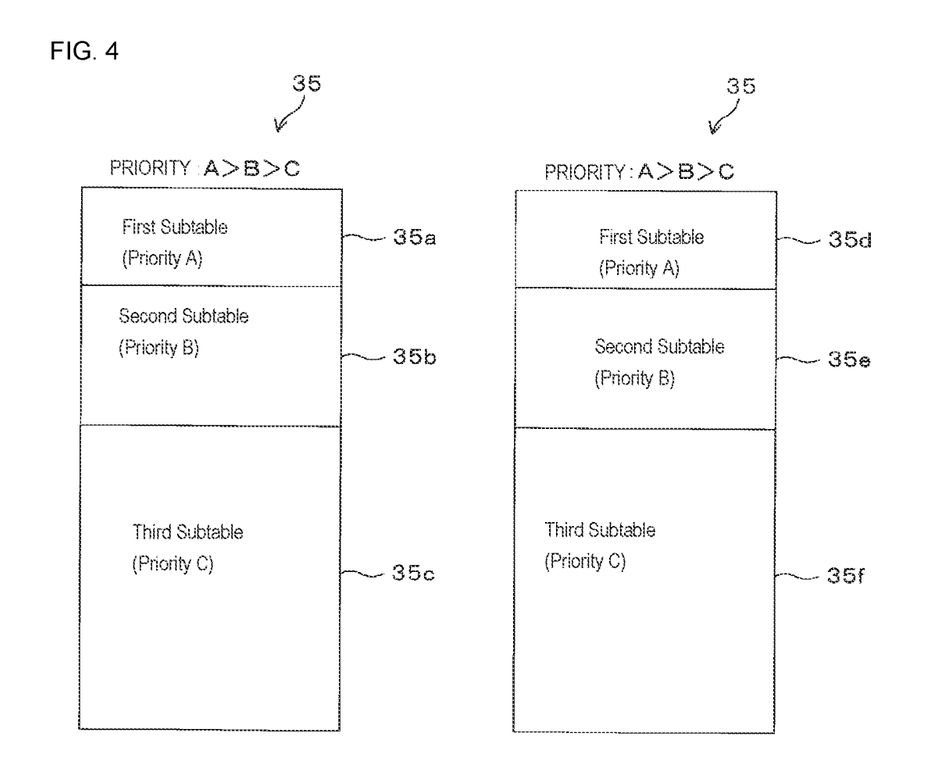
FIG. 4 is an explanatory diagram illustrating examples of partitioning of a relay information table.
Figure 5:
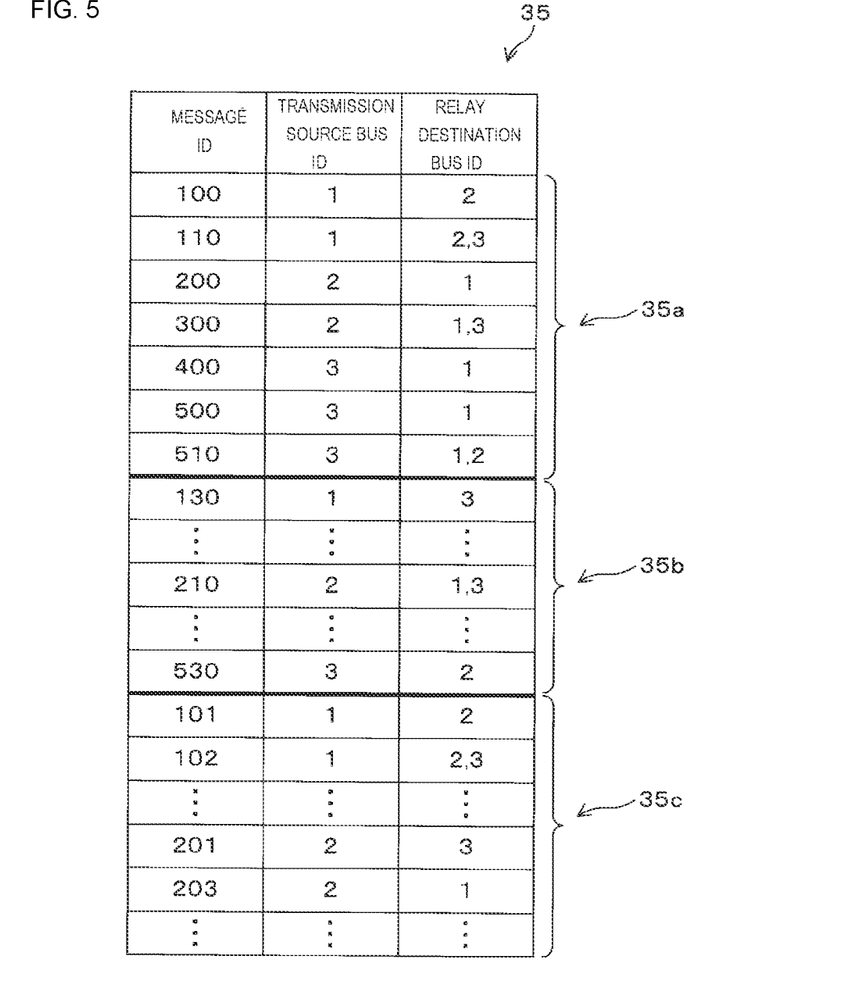
FIG. 5 is an explanatory diagram illustrating a specific example of the contents of the relay information table.
Figure 6:
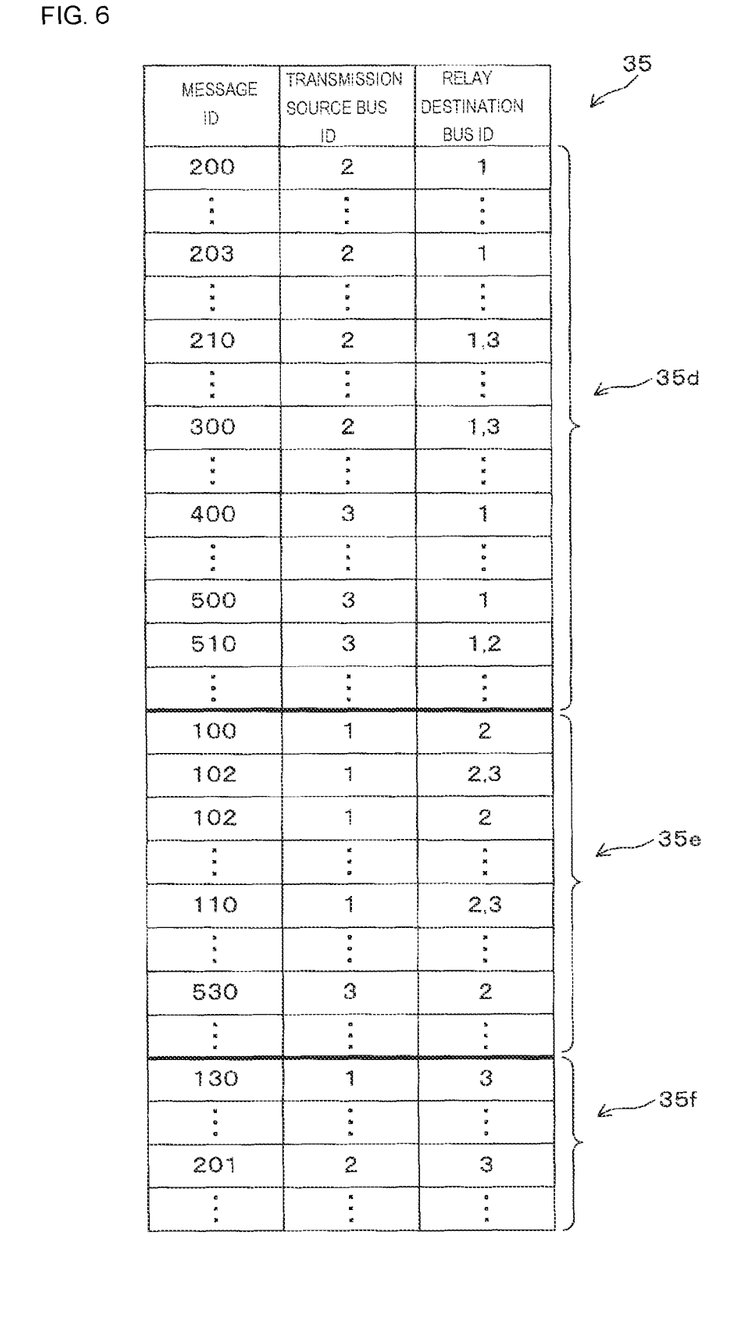
FIG. 6 is an explanatory diagram illustrating a specific example of the contents of the relay information table.

Next, the relay information table 35 will be described. FIG. 4 is an explanatory diagram illustrating examples of partitioning of the relay information table 35 stored in the ROM 31 of the relay device 3. FIGS. 5 and 6 are explanatory diagrams illustrating specific examples of the contents of the relay information table 35. As shown in FIG. 4, the relay information table 35 is partitioned into a first sub-table 35a (or 35d), a second sub-table 35b (or 35e), and a third sub-table 35c (or 35f). The number of partitions is not limited to 3 and may be 2 or 4 or more. FIG. 5 shows a specific example in the case where the relay information table 35 is partitioned into the first sub-table 35a, the second sub-table 35b, and the third sub-table 35c. FIG. 6 shows a specific example in the case where the relay information table 35 is partitioned into the first sub-table 35d, the second sub-table 35e, and the third sub-table 35f.

Each sub-table stores a plurality of records that specify relay destinations of frames to be relayed with the same priority. Here, the priority of a frame to be relayed and the priority of a sub-table storing the record that specifies the relay destination of that frame are used interchangeably. In the example shown in FIG. 4, the first sub-table 35a (or 35d) has the highest priority, and the third sub-table 35c (or 35f) has the lowest priority. When the relay device 3 searches the relay information table 35 to specify the relay destination of a frame, the search is performed in descending order of priority, beginning from the first sub-table 35a (or 35d).

Referring now to FIG. 5 (or FIG. 6), the first sub-table 35a (or 35d) stores a plurality of records in which relay destination bus IDs (corresponding to relay destination identifying information) for identifying the communication buses 2a, 2b, and 2c as relay destinations are associated with message IDs (corresponding to type identifying information). In each record, a transmission source bus ID for identifying the communication bus 2a, 2b, or 2c to which a transmission source communication device 4 transmitting a frame is connected is also associated with the message ID. Transmission source bus IDs are not necessarily required to be contained in the first subtable 35a (or 35d). Transmission source IDs for identifying transmission source communication devices 4 may also be contained in the first sub-table 35a (or 35d).

With regard to the relay destination bus IDs and the transmission source bus IDs, "1" represents the communication bus 2a to which the first transmitting/receiving unit 38a is connected, "2" represents the communication bus 2b to which the second transmitting/receiving unit 38b is connected, and "3" represents the communication bus 2c to which the third transmitting/receiving unit 38c is connected. The contents of the second sub-table 35b (or 35e) and the third sub-table 35c (or 35f) are the same as those of the first sub-table 35a (or 35d); however, different sub-tables have different priorities in accordance with the message IDs contained in the records stored therein.

In the example shown in FIG. 5 (or FIG. 6), it is indicated that, in the record with the message ID "110", for example, a communication device 4 connected to the communication bus 2a (transmission source bus ID: 1) is the transmission source, and the communication bus 2b (relay destination bus ID: 2) and the communication bus 2c (relay destination bus ID: 3) are the relay destinations. Moreover, it is indicated that, in the record with the message ID "300", a communication device 4 connected to the communication bus 2b (transmission source bus ID: 2) is the transmission source, and the communication bus 2a (relay destination bus ID: 1) and the communication bus 2c (relay destination bus ID: 3) are the relay destinations. Furthermore, it is indicated that the frames containing the message IDs "100, 110, 200, 300, 400, 500, and 510" (or "200, 203, 210, 300, 400, 500, 510, ...") have the highest priority. In particular, in FIG. 6, it is indicated that the frames with respect to which at least one of the relay destination bus IDs is "1" have the highest priority, and frames with respect to which the relay destination bus ID is "3" have the lowest priority.

If the CPU 30 detects that a frame has been received from the first transmitting/receiving unit 38a based on a notification from the communication control unit 36, the CPU 30 first searches the first sub-table 35a (or 35d) using the message ID contained in the received frame as a search key, and specifies, as the relay destination, the communication bus that is identified by the relay destination bus ID associated with the message ID in the matching record obtained in the search. If no matching record is obtained in the search of the first sub-table 35a (or 35d), the second sub-table 35b (or 35e) and the third sub-table 35c (or 35f) are sequentially searched. If no matching record is obtained in the search of all of the sub-tables, the received frame is used for processing (e.g., logging) in the relay device 3, or is abandoned when this is unnecessary.

For example, if a frame with the message ID "110" is received, the first sub-table 35a (or the first sub-table 35d and the second sub-table 35e) is searched using the message ID "110" as the search key, and thus, the communication bus 2b (relay destination bus ID: 2) and the communication bus 2c (relay destination bus ID: 3) are specified as the relay destinations. The CPU 30 causes the communication control unit 36 to have the second transmitting/receiving unit 38b and the third transmitting/receiving unit 38c, which are respectively connected to the specified communication buses 2b and 2c, transmit the frame to be relayed.

Next, the priority of frames will be described. To begin with, if frames to be relayed contain information that indicates their priority, such as priority information defined by a communication protocol, and the relay information table 35 is searched based on the information that indicates the priority, quick search for a record can be performed by creating, in advance, an index based on the above-described information that indicates the priority. In this case, records that specify the relay destinations of frames of high priority are first searched by dividing the index in accordance with the level of priority, and therefore, it is not necessary to partition the relay information table 35 into sub-tables. On the other hand, this does not apply in the case where the relay information table 35 is searched using, as the search key, information that does not directly represent the priority, like message IDs of the CAN protocol or IP addresses of the TCP/IP protocol.

Specifically, according to the present embodiment, the relay information table 35 is searched using a message ID of the CAN protocol as the search key, but, for example, even in the case where the smaller the value indicated by the message ID of a frame in a specific communication bus, the higher the priority of that frame in that communication bus, this frame does not necessarily need to be relayed with the same priority when it is relayed. That is to say, the priority of a frame to be relayed cannot be uniquely determined by the message ID, and furthermore, information that indicates the priority is not contained in the frame. Therefore, even when an index based on message IDs is created in searching of the relay information table 35, it is not possible to preferentially search for a record containing a specific message ID that is extracted at random.

For example, assuming a configuration in which the relay information table 35 is not partitioned, and the relay information table 35 contains 255 records that are sorted in the order of the values indicated by the message IDs, if binary tree searching is performed on the 255 records using a message ID as the search key, it is necessary to uniformly perform "$[\log_2 255]+1=8$ cycles" ([ ] is the Gauss' notation) of comparison processing. To address this issue, the relay device 3 according to the present description adopts a configuration in which, for example, the relay information table 35 is partitioned into the three sub-tables, the first sub-table 35a, the second sub-table 35b, and the third sub-table 35c, so that a record containing a message ID of a frame of relatively high priority can be searched for through fewer than 8 comparison cycles. The sub-tables are also sorted in the order of values indicated by message IDs (corresponding to a predetermined order based on type identifying information).

Next, a search for a record when the relay information table 35 is partitioned into three sub-tables will be described. As shown in FIG. 5, the first sub-table 35a stores seven records. It is assumed that the second sub-table 35b and the third sub-table 35c store 15 records and 233 (=255−7−15) records, respectively. When binary tree searching is first performed on the seven records in the first sub-table 35a using a message ID as the search key, "$[\log_2 7]+1=3$ cycles" of comparison processing are performed. When binary tree searching is subsequently performed on the 15 records in the second sub-table 35b, "$[\log_2 15]+1=4$ cycles" of comparison processing are performed. When binary tree searching is finally performed on the 233 records in the third sub-table 35c, "$[\log_2 233]+1=8$ cycles" of comparison processing are performed.

That is to say, the relay destination of a frame whose message ID is contained in a record stored in the first sub-table 35a will be specified in as few as 3 cycles of comparison processing. Also, the relay destination of a frame whose message ID is contained in a record stored in the second sub-table 35b will be specified in 7 (=3+4) cycles of comparison processing. On the other hand, the relay destination of a frame whose message ID is contained in a record stored in the third sub-table 35c will be specified in 15 (=3+4+8) cycles of comparison processing. In this manner, as a result of partitioning the relay information table 35 into the three sub-tables and searching the three sub-tables, the relay destinations of frames of higher levels of priority can be specified more quickly, and the number of comparison cycles in searching increases only in a stepwise manner for frames of relatively low levels of priority.

The priority of frames may be set in accordance with the frequency of occurrence of the frames that are identified by the message IDs, or may be set such that, in the case of the relay device 3 installed in the vehicle 100, frames having message IDs related to travelling control and frames having message IDs related to events, such as malfunctions, that occur unexpectedly are assigned high levels of priority. Moreover, the priority of frames may be set in accordance with the transmission source IDs or the transmission source bus IDs, or the priority of frames may be set in accordance with the relay destination bus IDs as illustrated in FIG. 6.

However, the relay device 3 need not change the processing details in accordance with the contents of the relay information table 35.

Figure 7:
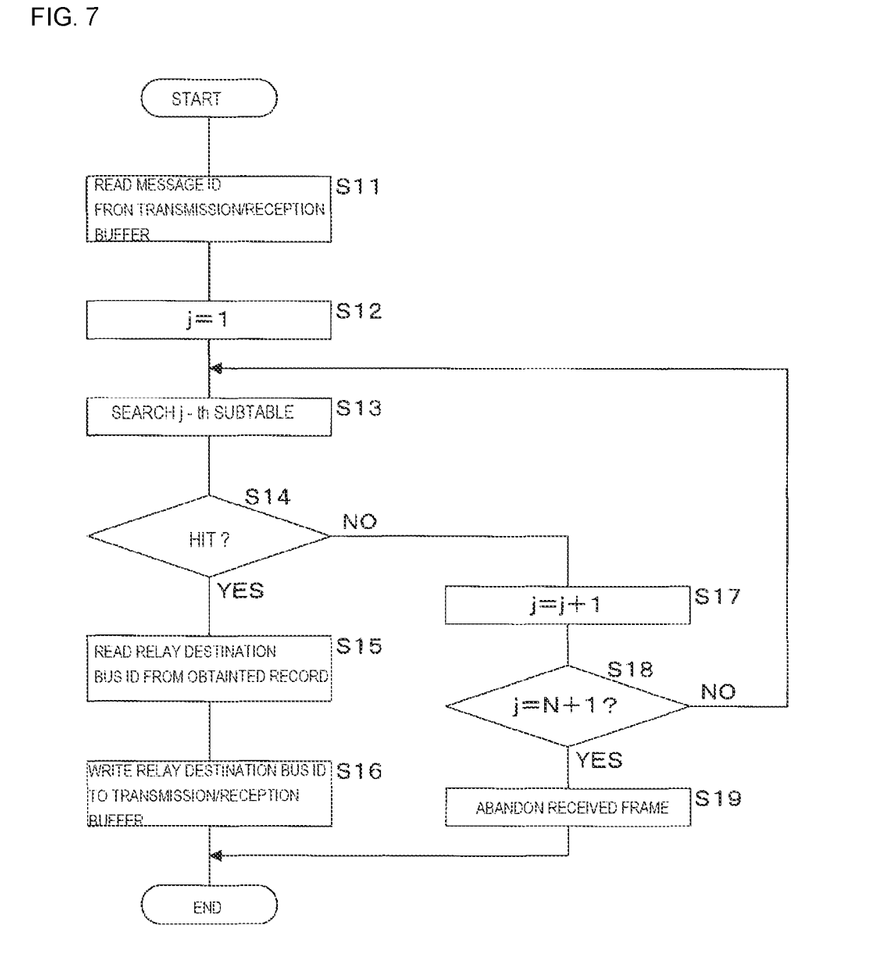
FIG. 7 is a flowchart illustrating a processing procedure that a CPU follows to search the relay information table so as to identify a relay destination.

Hereinafter, the operation of the above-described relay device 3 will be described using a flowchart illustrating the operation. FIG. 7 is a flowchart illustrating a processing procedure that the CPU 30 follows to search the relay information table 35 to specify a relay destination. The processing shown in FIG. 7 is activated when the communication control unit 36 notifies the CPU 30 that a frame has been received by the first transmitting/receiving unit 38a, the second transmitting/receiving unit 38b, or the third transmitting/receiving unit 38c, and the contents of the received frame have been written to the transmission/reception buffer 37. The notification contains the leading address (pointer) of the contents of the received frame that have been written to the transmission/reception buffer 37. Note that "N" in the following processing represents the total number of subtables and is stored in the ROM 31.

If the processing in FIG. 7 is activated, the CPU 30 reads the message ID from the contents of the received frame that have been written to the transmission/reception buffer 37 (S11). Then, the CPU 30 initializes "j", which is used as a loop counter, to 1 (S12), and searches the j-th sub-table "35a, 35b, or 35c (or 35d, 35e, or 35f)" through binary tree searching using the read message ID as the search key (S13).

After that, the CPU 30 judges whether or not there is a search hit (S14), and if so (S14: YES), reads the relay destination bus ID from the obtained record (S15). The CPU 30 writes the read relay destination bus ID to the transmission/reception buffer 37 so as to add the relay destination bus ID to the contents of the received frame that is being processed (S16), and ends the processing in FIG. 7.

The contents of the received frame to which the relay destination bus ID has been added constitute, on an "as-is" basis, the contents of the frame to be transmitted, except for the relay destination bus ID, and are transmitted from the first transmitting/receiving unit 38a, the second transmitting/receiving unit 38b, or the third transmitting/receiving unit 38c based on the added relay destination bus ID through transmission processing that is different from the processing shown in FIG. 7. In the transmission processing, frames other than a received frame that is abandoned at step S19, which will be described later, are transmitted in received order.

On the other hand, if there is no search hit at step S14 (S14: NO), the CPU 30 increments "j" by 1 (S17), and judges whether or not "j" is N+1 (S18). If "j is N+1 (S18: YES), the CPU 30, judging that the search of all of the sub-tables has been completed, abandons the received frame that is being processed (S19), and ends the processing in FIG. 7. If "j" is not N+1 (S18: NO), the CPU 30 advances the processing to step S13 in order to search the next sub-table.

Note that although the foregoing embodiment has been described using the CAN protocol as an example, the present description is not limited to this and is also applicable to other communication protocols such as LIN, MOST, TCP/IP, AVTP, and FlexRay, for example.

As described above, according to the present embodiment, records in which message IDs for identifying frame types are associated with relay destination bus IDs for identifying communication buses serving as relay destinations of frames are stored in the relay information table 35, and furthermore, the relay information table 35 is partitioned into the first sub-table 35a (or 35d), the second sub-table 35b (or 35e), and the third sub-table 35c (or 35f) in accordance with priority based on the message IDs or the relay destination bus IDs contained in the records. The relay device 3 receives a frame transmitted from a communication device 4 connected to any one of the three communication buses 2a, 2b, and 2c, searches the first sub-table 35a (or 35d), the second sub-table 35b (or 35e), and the third sub-table 35c (or 35f) in descending order of priority using the message ID contained in the received frame as the search key, and transmits the received frame to a communication bus that is identified by the relay destination bus ID contained in a matching record obtained in the search so as to relay the received frame.

Thus, the higher the priority of a frame based on the message ID or the relay destination bus ID thereof, the fewer the number of comparison cycles that are performed to obtain a search hit, and accordingly, a communication bus serving as the relay destination of that frame is specified within a short period of time. The number of comparison cycles that are performed in the search increases only in a stepwise manner for frames of relatively low levels of priority. Therefore, it is possible to minimize a decrease in QoS while guaranteeing the maximum performance for certain communications with limited resources. The effect is especially pronounced if neither the information (e.g., priority field) that indicates the relay priority nor the information that is used to calculate the priority is contained in frames, and an index for searching a relay table in accordance with priority cannot be created in advance.

Moreover, according to the embodiment, since the first sub-table 35a (or 35d), the second sub-table 35b (or 35e), and the third sub-table 35c (or 35f) are sorted in the order of values indicated by the message IDs contained in respective records, the first sub-table 35a (or 35d), the second sub-table 35b (or 35e), and the third sub-table 35c (or 35f) can be quickly searched using a binary tree searching method, for example.

Furthermore, according to the embodiment, since frames conforming to the CAN, LIN, MOST, TCP/IP, AVTP, or FlexRay protocol are relayed, a relay device 3 suitable for an in-vehicle communication system can be realized.

The embodiment disclosed herein is to be considered in all respects as illustrative and not restrictive. The scope of the present description is defined by the appended claims rather than by the foregoing description, and all changes that fall within the meaning and range of equivalency of the claims are therefore intended to be embraced therein. Moreover, the technical features described in the embodiment may be combined with one another.

LIST OF REFERENCE NUMERALS

1 In-vehicle communication system
100 Vehicle
2a, 2b, 2c Communication bus
3 Relay device
30 CPU
31 ROM
35 Relay information table
35a First sub-table
35b Second sub-table
35c Third sub-table
36 Communication control unit
37 Transmission/reception buffer
4 Communication device

The invention claimed is:

1. A relay device for transmitting a frame transmitted from any of a plurality of external devices that are communicably connected via a plurality of communication lines, the external device being connected to one of the communication lines, to another one of the communication lines, thereby relaying the frame, the relay device comprising:
   a relay information table in which type identifying information for identifying a message identification of the frame is stored in association with relay destination identifying information for identifying a communication line serving as a relay destination of the frame; and
   a control unit configured to search the relay information table based on the type identifying information contained in the frame transmitted from the external device, thereby specifying the relay destination of the frame,
   wherein the relay information table is partitioned into a plurality of sub-tables defined by a priority, each of the priority of a respective one of the plurality of sub-tables being different from each other, wherein each sub-table stores a plurality of records that specify relay destinations of frames to be relayed with a same priority, wherein the priority is based on the type identifying information or the relay destination identifying information, and
   the control unit is configured to search the sub-tables in descending order of priority.

2. The relay device according to claim 1, wherein the sub-tables are sorted in a predetermined order based on the type identifying information.

3. The relay device according to claim 1 wherein the frame is a frame conforming to a CAN, LIN, MOST, TCP/IP, AVTP, or FlexRay (registered trademark) communication protocol.

* * * * *